United States Patent
Fujiwara (10) Patent No.: US 10,166,945 B2
(45) Date of Patent: Jan. 1, 2019

(54) FAR SIDE AIRBAG DEVICE FOR VEHICLE

(71) Applicant: TOYOTA JIDOSHA KABUSHIKI KAISHA, Toyota-shi, Aichi-ken (JP)

(72) Inventor: Yusuke Fujiwara, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 489 days.

(21) Appl. No.: 14/875,116

(22) Filed: Oct. 5, 2015

(65) Prior Publication Data

US 2016/0107604 A1 Apr. 21, 2016

(30) Foreign Application Priority Data

Oct. 21, 2014 (JP) ................................. 2014-214713

(51) Int. Cl.
  *B60R 21/207* (2006.01)
  *B60R 21/231* (2011.01)
  *B60R 21/233* (2006.01)

(52) U.S. Cl.
  CPC ...... *B60R 21/23138* (2013.01); *B60R 21/233* (2013.01); *B60R 21/207* (2013.01); *B60R 2021/23146* (2013.01); *B60R 2021/23161* (2013.01); *B60R 2021/23324* (2013.01)

(58) Field of Classification Search
  CPC ...... B60R 21/2017; B60R 2021/23146; B60R 2021/23161; B60R 21/207
  See application file for complete search history.

(56) References Cited

U.S. PATENT DOCUMENTS 5,499,840 A * 3/1996 Nakano ................ B60N 2/0705
                                                   280/730.1
7,681,907 B2 * 3/2010 Svenbrant ............. B60R 21/207
                                                   280/728.2
(Continued)

FOREIGN PATENT DOCUMENTS

DE       19603106 A1   7/1997
DE    203 07 535 U1    8/2003
(Continued)

OTHER PUBLICATIONS

Oct. 25, 2016 Office Action issued in Japanese Patent Application No. 2014-214713.

*Primary Examiner* — Ruth Ilan
(74) *Attorney, Agent, or Firm* — Oliff PLC (57) ABSTRACT

A far side airbag device for a vehicle includes: an inflator disposed within a side support portion at a vehicle transverse direction central side of a seat back; an airbag that is stored within the side support portion, that receives a supply of gas from the inflator, and that expands and deploys while rupturing a planned rupture portion installed at the side support portion; and a partitioning portion partitioning the airbag into a main chamber and a chamber for rupturing that is provided at a rear side and a lower side of the main chamber. At least a lower end side region of the chamber for rupturing, in an expanded and deployed state, protrudes further toward a vehicle front side than the planned rupture portion. Communication ports communicating the respective chambers with one another are formed at an upper end side and a lower end side of the partitioning portion.

10 Claims, 6 Drawing Sheets

(56) References Cited

U.S. PATENT DOCUMENTS

| | | | |
|---|---|---|---|
| 7,971,901 B2 * | 7/2011 | Tomitaka | B60R 21/207 280/730.2 |
| 8,328,227 B2 | 12/2012 | Shimono | |
| 8,388,019 B2 * | 3/2013 | Wipasuramonton | B60R 21/23138 280/730.2 |
| 9,254,811 B2 * | 2/2016 | Hayashi | B60R 21/231 |
| 9,469,268 B2 * | 10/2016 | Sugimoto | B60R 21/23138 |
| 9,688,234 B2 * | 6/2017 | Yamanaka | B60R 21/23138 |
| 9,783,149 B2 * | 10/2017 | Taguchi | B60R 21/23138 |
| 2004/0119269 A1 * | 6/2004 | Yokota | B60R 21/23138 280/730.2 |
| 2005/0006883 A1 * | 1/2005 | Sato | B60R 21/23138 280/730.2 |
| 2005/0236819 A1 | 10/2005 | Riedel et al. | |
| 2006/0001244 A1 | 1/2006 | Taguchi et al. | |
| 2006/0202450 A1 | 9/2006 | Madasamy et al. | |
| 2006/0255572 A1 | 11/2006 | Svenbrandt et al. | |
| 2007/0108745 A1 * | 5/2007 | Belwafa | B60R 21/23138 280/730.2 |
| 2010/0244412 A1 | 9/2010 | Yamashita | |
| 2011/0049825 A1 | 3/2011 | Martini et al. | |
| 2011/0049852 A1 | 3/2011 | Kibat et al. | |
| 2011/0285119 A1 * | 11/2011 | Yamamoto | B60R 21/23138 280/743.2 |
| 2012/0025499 A1 * | 2/2012 | Shibayama | B60R 21/233 280/730.2 |
| 2012/0049498 A1 | 3/2012 | Wiik et al. | |
| 2012/0091697 A1 | 4/2012 | Wiik et al. | |
| 2012/0181780 A1 * | 7/2012 | Rickenbach | B60R 21/207 280/730.2 |
| 2013/0200597 A1 | 8/2013 | Honda et al. | |
| 2014/0035264 A1 * | 2/2014 | Fukushima | B60R 21/23138 280/730.2 |
| 2014/0239618 A1 * | 8/2014 | Katsumata | B60R 21/23138 280/728.3 |
| 2015/0197209 A1 * | 7/2015 | Fujiwara | B60R 21/231 280/730.1 |
| 2015/0274117 A1 * | 10/2015 | Iida | B60R 21/23138 280/729 |
| 2015/0367804 A1 * | 12/2015 | Fujiwara | B60R 21/207 280/730.2 |
| 2016/0096504 A1 * | 4/2016 | Fujiwara | B60R 21/23138 280/729 |

FOREIGN PATENT DOCUMENTS

| | | | | |
|---|---|---|---|---|
| DE | 10347315 A1 * | 5/2005 | | B60N 2/4876 |
| DE | 10 2005 028 702 A1 | 3/2006 | | |
| EP | 0810125 A2 * | 12/1997 | | B60R 21/23138 |
| GB | 2309440 A | 7/1997 | | |
| GB | 2404634 A * | 2/2005 | | B60R 21/23138 |
| JP | 2001-219808 A | 8/2001 | | |
| JP | 2005-306377 A | 11/2005 | | |
| JP | 2010-228668 A | 10/2010 | | |
| JP | 2011-057208 A | 3/2011 | | |
| JP | 2012-051557 A | 3/2012 | | |
| JP | 2012-081958 A | 4/2012 | | |
| JP | 2013-159305 A | 8/2013 | | |
| JP | 2014162390 A * | 9/2014 | | B60R 21/23138 |
| WO | WO-2010108590 A1 * | 9/2010 | | B60R 21/23138 |
| WO | WO-2013168556 A1 * | 11/2013 | | B60R 21/231 |
| WO | 2014/098027 A1 | 6/2014 | | |

* cited by examiner

FAR SIDE AIRBAG DEVICE FOR VEHICLE

CROSS-REFERENCE TO RELATED APPLICATION

This application claims priority under 35 USC 119 from Japanese Patent Application No. 2014-214713 filed Oct. 21, 2014, the disclosure of which is incorporated by reference herein.

BACKGROUND

Technical Field

The technique of the present disclosure relates to a far side airbag device for a vehicle that is provided in the side support portion that is at the vehicle transverse direction central side of a seatback of a vehicle seat.

Related Art

In the airbag device (side airbag device) disclosed in Japanese Patent Application Laid-Open (JP-A) No. 2012-051557, an airbag bag body has a inflating region that receives a supply of gas from an inflator and expands, and a non-inflating region. An opening is formed at the non-inflating region. A tether that is inserted-through this opening is connected to the rear end portion and the front end portion of the airbag bag body. The locus of expansion of the airbag bag body is controlled by this tether. This airbag bag body is, for example, housed within the side support portion that is at the vehicle transverse direction central side of a seatback, and expands and deploys to the exterior of the side support portion while rupturing a planned rupture portion that is installed at the side support portion.

Because the above-described airbag bag body is a structure of a large volume that can protect the region from the head portion to the abdominal portion of a vehicle occupant, the rise in the internal pressure of the airbag bag body is slow when the output of the inflator is low. Therefore, there is the possibility that the planned rupture portion will not rupture at the appropriate timing and the inflation and expansion of the airbag bag body will be delayed, and the possibility that the airbag bag body will burst within the side support portion. Further, due to there being dispersion in the position where the planned rupture portion starts to rupture, there is also the possibility that the expansion behavior of the airbag bag body will be unstable. When merely the output of the inflator is increased as a countermeasure for preventing this, the high-pressure airbag bag body expands and deploys from the side support portion, which affects the performance of protecting a vehicle occupant who is positioned at an improper position that is the inflation/expansion region of the airbag bag body (the so-called OOP performance).

SUMMARY

The present invention provides a far side airbag device for a vehicle that contributes to the co-existence of the OOP performance and the expansion performance of an airbag that protects at least the region from the head portion to the chest portion of a vehicle occupant.

A far side airbag device for a vehicle relating to a first aspect of the present invention has: an inflator that is disposed within a side support portion at a vehicle transverse direction central side of a seat back; an airbag that is stored within the side support portion, that receives a supply of gas from the inflator, that expands and deploys while rupturing a planned rupture portion that is installed at the side support portion, and that protects a region at least from a head portion to a chest portion of a vehicle occupant; and a partitioning portion that partitions the airbag into a main chamber and a chamber for rupturing that is provided at a rear side and a lower side of the main chamber and that houses the inflator, at least a lower end side region of the chamber for rupturing, in an expanded and deployed state, protruding further toward a vehicle front side than the planned rupture portion, with communication ports, that communicate the respective chambers with one another, being formed at an upper end side and a lower end side of the partitioning portion.

In the far side airbag device for a vehicle relating to the first aspect of the present invention, the airbag, that is stored within the side support portion that is at the vehicle transverse direction central side of the seat back, is partitioned by the partitioning portion into the main chamber and the chamber for rupturing. The inflator, that is disposed within the side support portion, is housed in the chamber for rupturing. This inflator is operated when the vehicle is involved in a side collision for example, and gas is supplied from the inflator to the chamber for rupturing. Some of the gas that is supplied to the chamber for rupturing passes-through the communication ports that are formed at the upper end side and the lower end side of the partitioning portion, and is supplied to the main chamber. Due thereto, the air bag expands and deploys while rupturing the planned rupture portion that is installed at the side support portion, and protects at least the region from the head portion to the chest portion of the vehicle occupant.

Here, when the inflator operates as described above, the chamber for rupturing that houses the inflator expands and deploys earlier and at a higher pressure than the main chamber. Further, at least the lower end side region of the chamber for rupturing that is high pressure protrudes at an early stage further toward the vehicle front side than the planned rupture portion. Due thereto, at least the lower end side of the planned rupture portion can be ruptured, and therefore, the airbag can be expanded and deployed at least from the lower end side. As a result, the lower end side of the main chamber expands and deploys due to the gas that is supplied from the communication port, that is formed at the lower end side of the partitioning portion, to the lower end side of the main chamber, and some of the gas that is supplied to the lower end side of the main chamber flows to the upper portion side of the main chamber. Because gas is supplied to the upper portion side of the main chamber also from the communication port that is formed at the upper end side of the partitioning portion, the flow rates of the gasses that are supplied by the above-described two paths are well balanced, and, due thereto, the upper portion side of the main chamber can be expanded and deployed stably from the lower side toward the upper side.

Moreover, in the technique of the present disclosure, the chamber for rupturing that is high-pressure is provided at the rear side and the lower side of the main chamber that is low-pressure. Due thereto, even in a case in which the airbag expands and deploys in a state in which the vehicle occupant is positioned at an improper position that is the region of inflation and expansion of the airbag, the main chamber that is low-pressure can be made to interfere with the vehicle occupant who is at the improper position. Due to the above, this contributes to the co-existence of the expansion performance and the OOP performance of the airbag.

In a far side airbag device for a vehicle relating to a second aspect of the present invention, in the first aspect of the present invention, a front portion side, from an upper end portion to a lower end portion of the chamber for rupturing, in the expanded and deployed state, protrudes further toward the vehicle front side than the planned rupture portion.

In the far side airbag device for a vehicle relating to the second aspect of the present invention, the front portion side, from the upper end portion to the lower end portion, of the chamber for rupturing that expands and deploys earlier and at a higher pressure than the main chamber, protrudes further toward the vehicle front side than the planned rupture portion. Due thereto, the wide range of the planned rupture portion can be ruptured at an early stage, and therefore, this contributes to an improvement in the expansion performance of the airbag.

In a far side airbag device for a vehicle relating to a third aspect of the present invention, in the second aspect, the chamber for rupturing is formed such that, in the expanded and deployed state, a front edge portion runs along the planned rupture portion.

In the far side airbag device for a vehicle relating to the third aspect of the present invention, the chamber for rupturing at which, in the expanded and deployed state, the region from the upper end portion to the lower end portion protrudes further toward the vehicle front side than the planned rupture portion, is formed as described above. Therefore, it can be made such that the chamber for rupturing does not greatly protrude partially from the planned rupture portion. Due thereto, the OOP performance can be ensured while the expansion performance of the airbag is improved.

In a far side airbag device for a vehicle relating to a fourth aspect of the present invention, in the first aspect of the present invention, the partitioning portion is structured by any of a sewn partitioning portion that includes a sewn portion at which the airbag is sewn, a tether that is sewn to the airbag, or an inner bag that is provided within the airbag.

In the far side airbag device for a vehicle relating to the fourth aspect of the present invention, because the partitioning portion is structured by any of the above, the partitioning portion can be made to be a simple structure.

As described above, the far side airbag device for a vehicle relating to an embodiment of the present invention contributes to the co-existence of the expansion performance and the OOP performance of an airbag that protects the region at least from the head portion to the chest portion of a vehicle occupant.

BRIEF DESCRIPTION OF THE DRAWINGS

Exemplary embodiments of the present invention will be described in detail based on the following figures, wherein.

DETAILED DESCRIPTION

<First Embodiment>

A far side airbag device 10 for a vehicle (hereinafter called "FS airbag device 10") relating to a first embodiment of the technique of the present disclosure is described hereinafter by using FIG. 1 through FIG. 7B. Note that arrow FR, arrow UP, and arrow OUT that are marked appropriately in the respective drawings indicate the frontward direction (advancing direction) of the vehicle, the upward direction, and the outer side in the transverse direction, respectively. Further, when merely longitudinal, left-right, and vertical directions are used hereinafter, they mean the longitudinal of the vehicle longitudinal direction, the left and right of the vehicle left-right direction (the vehicle transverse direction), and the vertical of the vehicle vertical direction, unless otherwise indicated.

(Structure)

Figure 1:
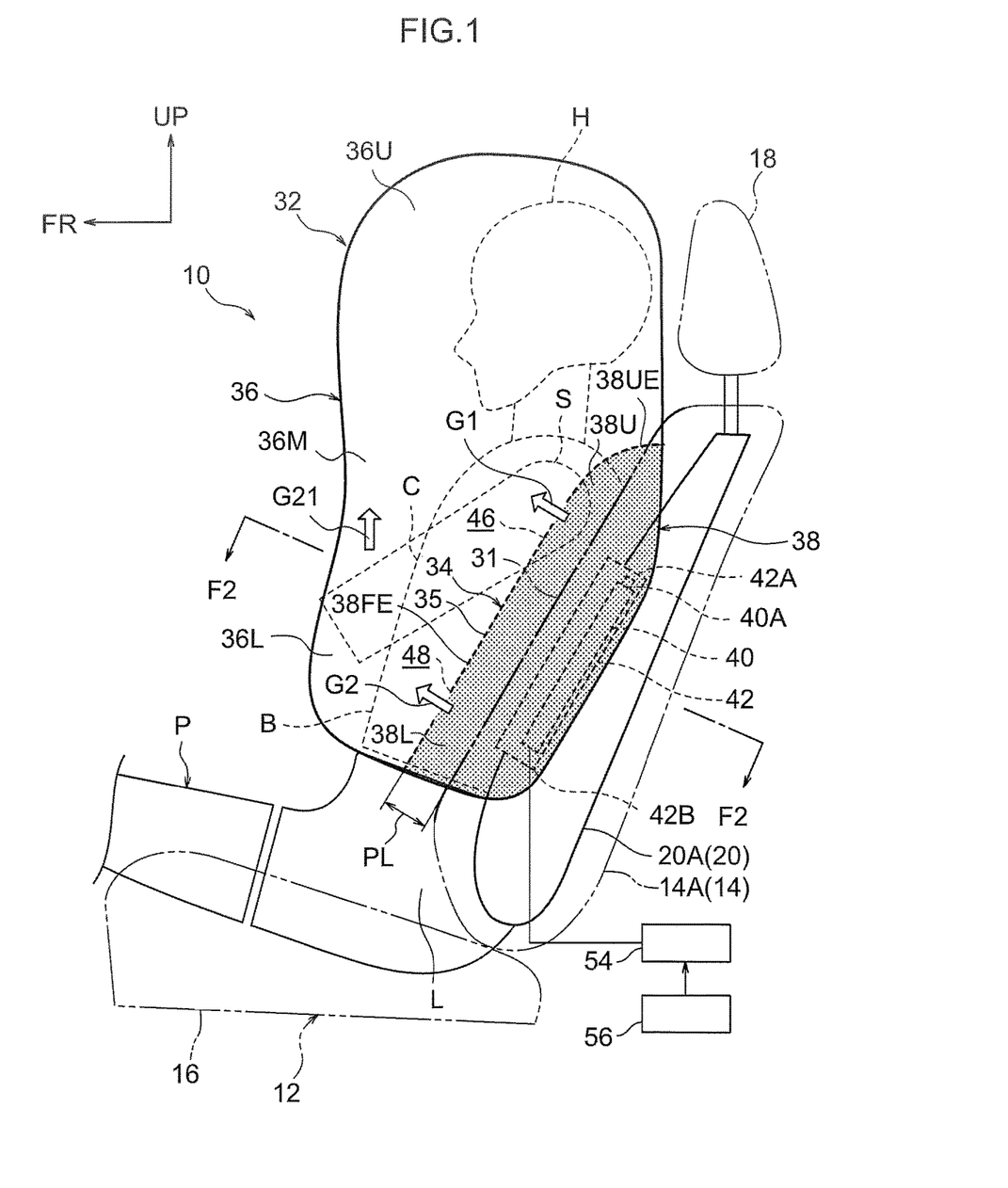
FIG. 1 is a side view of a vehicle seat that is structured with the far side airbag device for a vehicle relating to a first embodiment being applied thereto, and is a drawing showing an expanded and deployed state of a far side airbag.
Figure 2:
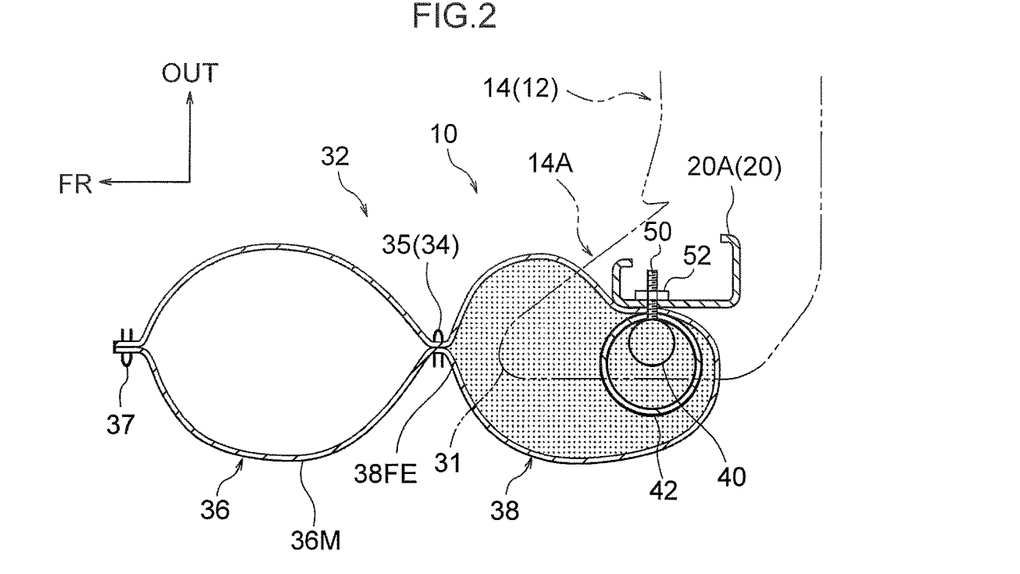
FIG. 2 is a schematic cross-sectional view showing, in an enlarged manner, the cross-section along line F2-F2 of FIG. 1.
Figure 3:
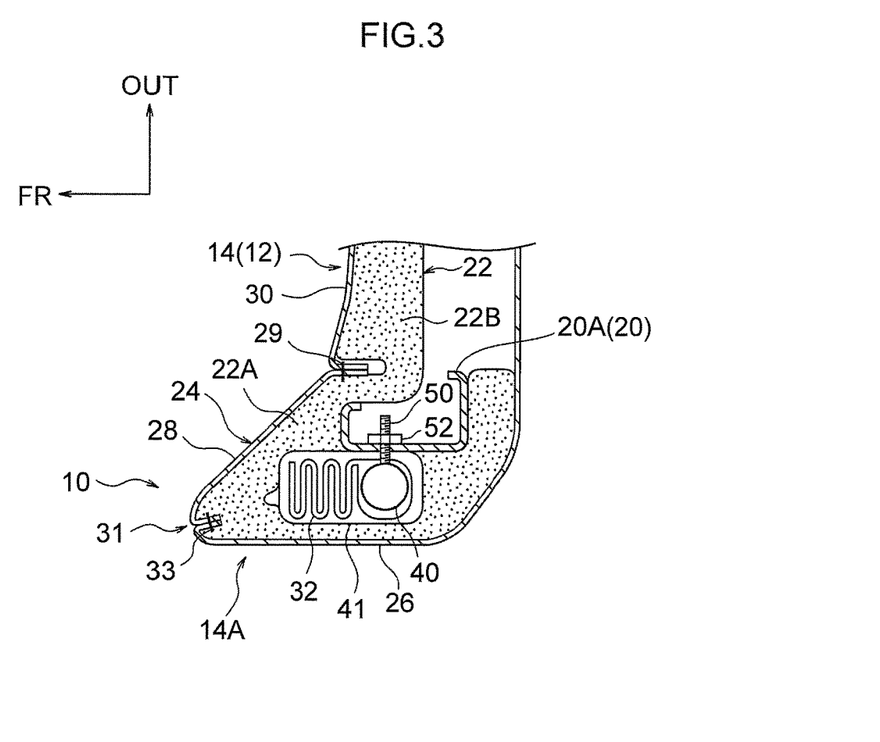
FIG. 3 is a cross-sectional view showing, in the same cross-section as FIG. 2, a state before inflation and expansion of the airbag.

As shown in FIG. 1 through FIG. 3, the FS airbag device 10 relating to the present embodiment is provided at a side support portion 14A (hereinafter simply called "central-side side portion 14A") that is at the vehicle transverse direction central side of a seat back 14 of a vehicle seat 12. This vehicle seat 12 is, for example, the driver's seat of a right-hand drive vehicle. The seat back 14 of this vehicle seat 12 is reclinably connected to the rear end portion of a seat cushion 16, and a headrest 18 is connected to the upper end portion of the seat back 14.

Note that, in the present embodiment, the longitudinal direction, the left-right direction (the transverse direction), and the vertical direction of the vehicle seat 12 coincide with the longitudinal direction, the left-right direction, and the vertical direction of the vehicle. Further, a crash test dummy P1 is seated in the vehicle seat 12 instead of an actual vehicle occupant as shown in FIG. 1. This dummy P1 is, for example, an AM50 (50th percentile U.S. adult male) World SID (internationally standardized side crash dummy: World Side Impact Dummy). This dummy P1 is seated in a standard seated posture that is prescribed by the crash test method. Further, the longitudinal position of the seat cushion 16 with respect to the vehicle, and the inclined position (the angle of inclination) of the seat back 14 with respect to the seat cushion 16, are adjusted to reference set positions that correspond to the aforementioned seated posture. Hereinafter, the dummy P1 is called "vehicle occupant P1" in order to make the explanation easy to understand.

As shown in FIG. 3, at the above-described seat back 14, a seat back pad 22 that is mounted to a seat back frame 20 is covered by a seat skin 24. The seat back frame 20 structures the skeleton of the seat back 14 and has left and right side frames 20A that extend in the height direction of the seat back 14 at the left and right both sides of the seat back 14 (the side frame 20A at the right side of the seat is not illustrated in FIG. 1 through FIG. 3).

The seat back pad 22 structures the cushion member of the seat back 14, and integrally has a pad side portion 22A that is disposed at the central-side side portion 14A, and a pad central portion 22B that is disposed at the central side of the seat back 14. The seat skin 24 structures the skin member of the seat back 14, and has a side skin 26 that covers the pad side portion 22A from the seat transverse direction outer side and the seat rear side, a front side skin 28 that covers the pad side portion 22A from the seat front side, and a front skin 30 that covers the pad central portion 22B from the seat front side. The side skin 26 extends toward the back surface side of the seat back 14.

The seat transverse direction inner side end portion of the front side skin 28 and the seat transverse direction outer side end portion of the front skin 30 are sewn together at a sewn portion 29 that is positioned at the seat transverse direction inner side end portion of the central-side side portion 14A. Further, the seat transverse direction outer side end portion of the front side skin 28 and the seat front side end portion of the side skin 26 are sewn together at a sewn portion 33 that is positioned at the front end portion (the so-called framing portion) of the central-side side portion 14A. This sewn portion 33 extends in the height direction of the seat back 14 along the framing portion of the central-side side portion 14A.

In the present embodiment, the region that runs along the above-described sewn portion 33 at the seat skin 24 is made to be a burst line portion (planned rupture portion) 31 that is a planned rupture portion. Note that, in FIG. 1, in order to make it easy to recognize the burst line portion 31, the burst line portion 31 is illustrated by the thick two-dot chain line. This burst line portion 31 structures a portion of the FS airbag device 10. Namely, the FS airbag device 10 relating to the present embodiment includes, as a constituent element thereof, a portion of the vehicle seat 12. Therefore, the present embodiment can also be interpreted as being an embodiment relating to the invention of a vehicle seat that is equipped with an FS airbag device (far side airbag device). Note that the planned rupture portion is not limited to a structure that is formed at the framing portion of the central-side side portion 14A, and may be structured so as to be formed at the seat transverse direction outer side surface (the vehicle transverse direction inner side surface) of the central-side side portion 14A.

A far side airbag 32 (hereinafter called "FS airbag 32"), that serves as an example of an airbag that is a structural member of the FS airbag device 10, is stored within the central-side side portion 14A that has the above-described structure. This FS airbag 32 is partitioned into a main chamber 36 and a chamber 38 for rupturing, by a sewn portioning portion 34 that serves as an example of a partitioning portion. An inflator 40 and a diffuser 42 (not illustrated in FIG. 3) are housed in the chamber 38 for rupturing. The FS airbag 32 is made into a module together with the inflator 40 and the diffuser 42, and is folded-up by a predetermined method of folding such as bellows-folding or roll-folding or the like (here, bellows-folding), and is enveloped by a wrapping material 41 that breaks easily.

The above-described FS airbag 32 is formed in the shape of an elongated bag due to a single base cloth, that is formed by cutting-out a nylon or polyester cloth material for example, being folded-in two and the outer peripheral edge portion being sewn at an outer peripheral sewn portion 37 (see FIG. 2: not illustrated in FIG. 1). This FS airbag 32 expands and deploys (the state shown in FIG. 1) toward the vehicle transverse direction central side (the front side of the central-side side portion 14A) with respect to the vehicle occupant P1, due to the pressure of gas that is generated from the inflator 40. There is a structure in which, at the time of this inflation and expansion, due to the above-described sewn portion 33 receiving the inflation pressure of the FS airbag 32 and breaking, and the seat skin 24 rupturing at the burst line portion 31, the FS airbag 32 expands and deploys toward the outer side of the central-side side portion 14A. Note that, at this time, the pad side portion 22A breaks to the left and the right at the rear of the burst line portion 31. Further, the longitudinal and vertical directions of the FS airbag 32 that are mentioned in the following description indicate the directions in the state in which the FS airbag 32 has expanded and deployed, and substantially coincide with the longitudinal and vertical directions of the vehicle, unless otherwise indicated.

This FS airbag 32 is formed so as to form a substantially rectangular form (a substantially elliptical form) that is elongated along the vehicle vertical direction, when the expanded and deployed state is viewed from the side surface side (here, the vehicle transverse direction central side) as shown in FIG. 1. This FS airbag 32 is formed to size (a large volume) that can protect the region from a head portion H to an abdominal portion B (the head portion H, a shoulder portion S, a chest portion C and the abdominal portion B) of the vehicle occupant P1. Note that FIG. 1 illustrates a state immediately before the region from the head portion H to the abdominal portion B of the vehicle occupant P1 is protected (restrained) by the FS airbag 32 (a non-restraining, expanded and deployed state: hereinafter simply called "expanded and deployed state"). Further, the size of the FS airbag 32 is not limited to that described above, and it suffices for the FS airbag 32 to be able to protect at least the region from the head portion H to the chest portion C.

The FS airbag 32 is partitioned, by the aforementioned sewn partitioning portion 34, into the main chamber 36 that is for protecting (restraining) the front portions of the chest portion C, the abdominal portion B and the shoulder portion S, and the head portion H, of the vehicle occupant P1, and the chamber 38 for rupturing that is for protecting (retraining) the rear portions of the chest portion C, the abdominal portion B and the shoulder portion S. The chamber 38 for rupturing is provided at the rear side and the lower side of the main chamber 36, and structures the region that is at the rear portion side and the lower portion side of the FS airbag 32.

The above-described sewn partitioning portion 34 is structured by a sewn portion (seam) 35 at which the base cloth of the FS airbag 32 is sewn, and an upper side communication port 46 and a lower side communication port 48 (both are communication ports) that are so-called inner vent holes. The sewn portion 35 extends toward the top of the seat back 14 from a vicinity of the longitudinal direction central portion of the lower edge of the FS airbag 32, and reaches a position that is slightly further upward than the vertical direction central portion of the rear edge of the FS airbag 32. The vertical direction intermediate portion and lower end portion of this sewn portion 35 are set so as to extend in a rectilinear form along the above-described burst line portion 31, and the upper end portion is convex toward the upper side and curves toward the rear side.

This sewn portion 35 is partially omitted at the upper portion side and the lower portion side, respectively, and the upper side communication port 46 and the lower side communication port 48 are formed at these places (non-sewn portions) where the sewn portion 35 is omitted. The upper side communication port 46 is formed at the upper end side of the sewn portion 35, and the lower side communication port 48 is formed at the lower end side of the sewn portion 35. Further, in the present embodiment, the opening surface area of the lower side communication port 48 is set to be larger than that of the upper side communication port 46. Note that final end processing is carried out, by sewing in circular shapes that are not illustrated respectively, on the end portions of the sewn portion 35 at the upper and lower both end sides of the upper side communication port 46 and the lower side communication port 48.

The upper side communication port 46 communicates the upper portion of the chamber 38 for rupturing and the vertical direction intermediate portion of the main chamber 36 with one another in the longitudinal direction of the seat back 14. Further, the lower side communication port 48 communicates the lower portion of the chamber 38 for rupturing and the lower portion of the main chamber 36 with one another in the longitudinal direction of the seat back 14. The directions of opening of the upper side communication port 46 and the lower set communication port 48 are, in the present embodiment, set to directions that intersect (in detail, directions that are orthogonal to or are substantially orthogonal to) the burst line portion 31 as seen in a side view of the seat.

On the other hand, the inflator 40 and the diffuser 42 are housed at the lower portion side and the rear end side of the FS airbag 32 interior. The diffuser 42 is a member that is called a loop diffuser, an inner tube, a flow regulating cloth or the like, and is formed by a base cloth, that is formed by cutting out a cloth material that is similar to the base cloth of the FS airbag 32 in a rectangular shape, being sewn in the shape of a cylindrical tube. This diffuser 42 is disposed in a posture in which the axial direction thereof runs along the height direction of the seat back 14. In the present embodiment, the diameter of the diffuser 42 is set to be the same from the upper end to the lower end, and the opening surface areas of an upper end opening 42A that is formed at the upper end and a lower end opening 42B that is formed at the lower end are set to be the same. This diffuser 42 has the function of distributing, upward and downward, the gas that is generated from the inflator 40.

The inflator 40 is a so-called cylinder-type gas generating device, and is formed in the shape of a cylindrical tube. The axial direction dimension of the inflator 40 is set to be slightly shorter than that of the diffuser 42, and the inflator 40 is accommodated at the inner side of the diffuser 42 in a posture in which the axial direction thereof runs along the axial direction of the diffuser 42. A pair of upper and lower stud bolts 50 (see FIG. 2 and FIG. 3) project-out toward the vehicle transverse direction outer side from this inflator 40. These stud bolts 50 pass-through the base cloth of the FS airbag 32, the base cloth of the diffuser 42, and the side frame 20A, and nuts 52 are screwed-together with the distal end sides thereof. Due thereto, the inflator 40 is, together with the FS airbag 32 and the diffuser 42, fastened and fixed to the seat back frame 20.

An ECU 54 (control device) that is installed in the vehicle is electrically connected to the inflator 40. A side collision sensor 56 that senses a side collision of the vehicle is electrically connected to this ECU 54. The ECU 54 and the side collision sensor 56 are structural members of the far side airbag device 10 for a vehicle. The ECU 54 is structured to operate (activate) the inflator 40 at the time of sensing (the inevitability of) a side collision of the vehicle on the basis of a signal from the side collision sensor 56. Note that, in a case in which a pre-crash sensor that forecasts (predicts) a side collision is electrically connected to the ECU 54, there may be a structure in which the inflator 40 is activated when the ECU 54 forecasts a side collision on the basis of a signal from the pre-crash sensor.

When the inflator 40 activates, gas is jetted-out into the diffuser 42 from a gas jetting-out portion 40A that is provided at one of the upper end portion and the lower end portion of the inflator 40 (here, the upper end portion). The gas that is jetted-out into the diffuser 42 is jetted-out from the upper end opening 42A to the upper portion of the chamber 38 for rupturing, and is jetted-out from the lower end opening 42B to the lower end portion of the chamber 38 for rupturing. Due thereto, the chamber 38 for rupturing expands and deploys before the main chamber 36. Some of the gas that is jetted-out into the chamber 38 for rupturing passes-through the upper side communication port 46, and is supplied to a vertical direction intermediate portion 36M of the main chamber 36 (see arrow G1 of FIG. 1). Further, some of the gas that is jetted-out into the chamber 38 for rupturing passes-through the lower side communication port 48, and is supplied to a lower portion 36L of the main chamber 36 (see arrow G2 of FIG. 1).

Due thereto, the main chamber 36 expands and deploys later than the chamber 38 for rupturing. In this case, because the opening surface area of the lower side communication port 48 is set to be larger than the opening surface area of the upper side communication port 46, there is a structure in which the flow rate of gas G2 is greater than the flow rate of gas G1. Further, the volume of the main chamber 36 is set to be sufficiently larger than the volume of the chamber 38 for rupturing, and the inflator 40 is housed within the chamber 38 for rupturing that has a small volume. Therefore, there is a structure in which, in the initial stage of activation of the inflator 40, the internal pressure of the chamber 38 for rupturing is higher than the internal pressure of the main chamber 36. Note that, in FIG. 1 and FIG. 2, dots are drawn in the chamber 38 for rupturing in order to make it easy to visualize the chamber 38 for rupturing being in a high-pressure state.

The chamber 38 for rupturing that has expanded and deployed forms a substantially cylindrical shape whose axial direction is the height direction of the seat back 14. At this chamber 38 for rupturing, in the expanded and deployed state, the front portion side thereof from an upper end portion 38U to a lower end portion 38L protrudes further toward the vehicle front side than the burst line portion 31, and a front edge portion 38FE is formed so as to run along the burst line portion 31. When viewing the expanded and deployed state of the chamber 38 for rupturing from the side, an upper edge portion 38UE of the chamber 38 for rupturing is formed so as to be convex and curve toward the upper side of the FS airbag 32. At this chamber 38 for rupturing, a protruding amount PL (see FIG. 1), from the burst line portion 31, of the region (protruding portion), that protrudes further toward the vehicle front side than the burst line portion 31 as described above, is set to be, for example, around 30 mm.

Figure 4A:
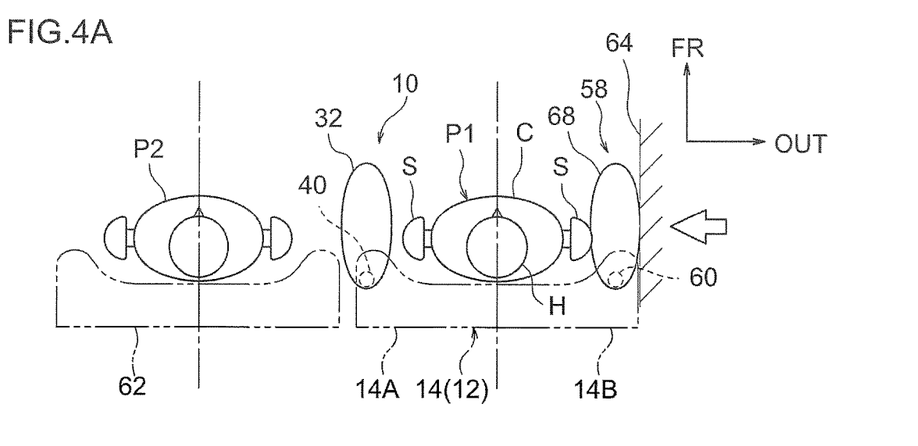
FIG. 4A is a plan view in which the situation within a vehicle cabin in the initial stage of a side collision is seen from an outer side of a vehicle.

Further, in the present embodiment, as shown in FIG. 4A, a near side airbag device 58 for a vehicle (hereinafter called "NS airbag device 58") is installed in an outer-side side portion 14B that is the side support portion that is at the vehicle transverse direction outer side of the seat back 14. This NS airbag device 58 for a vehicle is structured so as to expand and deploy a near side airbag 68 (not shown in FIG. 4C: hereinafter called "NS airbag 68") between the vehicle occupant P1 of the vehicle seat 12 (the driver's seat) and a side door 64, by the pressure of gas generated from an inflator 60 (not shown in FIG. 4B and FIG. 4C). There is a structure in which a planned rupture portion (a burst line portion: not illustrated) that is installed at the outer-side side portion 14B ruptures at the time of this inflation and expansion.

This NS airbag 68 is formed so as to protect, for example, the region from the shoulder portion S to the abdominal portion B or a lumbar portion L of the vehicle occupant P1, and is formed so as to have a sufficiently smaller volume than that of the FS airbag 32. Further, the above-described inflator 60 is structured so as to be operated (activated) simultaneously with the inflator 40 by the ECU 54. Note that, in FIG. 5, the relationship between the time from activation of the inflators 40, 60, and tank pressures of the inflators 40, 60, is shown in a graph. Further, in FIG. 6, the relationship between time from activation of the inflators 40, 60, and respective internal pressures of the main chamber 36, the chamber 38 for rupturing and the NS airbag 68, is shown in a graph.

(Operation and Effects)

Operation and effects of the present first embodiment are described next. In the FS airbag device 10 of the above-described structure, when the ECU 54 senses a side collision on the basis of a signal from the side collision sensor 56, the inflator 40 is operated, and gas is jetted-out from the gas jetting-out portion 40A of the inflator 40 into the diffuser 42. The gas, that has been jetted-out into the diffuser 42, is supplied from the upper end opening 42A and the lower end opening 42B into the chamber 38 for rupturing. Further, some of the gas that has been supplied to the chamber 38 for rupturing passes-through the upper side communication port 46 and the lower side communication port 48, and is supplied to the main chamber 36. Due thereto, the FS airbag 32 expands and deploys while rupturing the burst line portion 31 that is installed at the central-side side portion 14A, and protects (restrains) the region from the head portion H to the abdominal portion B of the vehicle occupant P1.

Here, when the inflator 40 operates as described above, the chamber 38 for rupturing that houses the inflator 40 expands and deploys at an earlier stage and at a higher pressure than the main chamber 36. Further, the front portion side of the high-pressure chamber 38 for rupturing from the upper end portion 38U to the lower end portion 38L protrudes at an early stage further toward the vehicle front side than the burst line portion 31, and ruptures the burst line portion 31. Due thereto, it can be made such that a delay in expansion does not occur at the FS airbag 32.

Moreover, because the lower end side of the burst line portion 31 is ruptured by the lower end portion 38L of the chamber 38 for rupturing, it can be made such that a delay in expansion does not occur at the lower end side of the FS airbag 32. Due thereto, this contributes to the FS airbag 32 being expanded and deployed stably from the lower side to the upper side.

Namely, due to the lower end side of the FS airbag 32 inflating and expanding at an early stage, the lower portion 36L of the main chamber 36 expands and deploys earlier than an upper portion 36U of the main chamber 36, due to the gas G2 that is supplied from the lower side communication port 48 to the lower portion 36L of the main chamber 36. Some of the gas G2 that is supplied to the lower portion 36L of the main chamber 36 flows to the upper portion side of the main chamber 36 (see arrow G21 of FIG. 1), and the gas G1 is supplied also from the upper side communication port 46 to the upper portion 36U of the main chamber 36. Due to the flow rates of these gasses G1, G21 being well balanced, the upper portion side of the main chamber 36 can be expanded and deployed stably from the lower side to the upper side.

Moreover, in the present embodiment, the chamber 38 for rupturing that is high-pressure is provided at the rear side and the lower side of the main chamber 36 that is low pressure. Therefore, even in a case in which the FS airbag 32 expands and deploys in a state in which the vehicle occupant is positioned at an improper position that is the inflation and expansion region of the FS airbag 32, the main chamber 36 that is low pressure can be made to interfere with the vehicle occupant who is at the improper position. Due thereto, the OOP performance can be ensured.

Due to the above, the present embodiment contributes to the co-existence of the expansion performance (expansion robustness) and the OOP performance at the FS airbag 32 that has a large volume and protects the region from the head portion H to the abdominal portion B of the vehicle occupant P1.

Further, in the present embodiment, the front portion side of the chamber 38 for rupturing from the upper end portion 38U to the lower end portion 38L protrudes further toward the vehicle front side than the burst line portion 31. Therefore, a wide range of the burst line portion 31 can be ruptured at an early stage. This contributes to an improvement in the expansion performance of the FS airbag 32. Moreover, the chamber 38 for rupturing is formed such that, in the expanded and deployed state, the front edge portion 38FE runs along the burst line portion 31. Therefore, it can be made such that the chamber 38 for rupturing does not greatly protrude partially from the burst line portion 31. Due thereto, the OOP performance can be ensured while the expansion performance of the FS airbag 32 is improved as described above.

Moreover, in the present embodiment, as described above, the burst line portion 31 is ruptured by the chamber 38 for rupturing that is high-pressure and is provided at the FS airbag 32, and thus, there is no need to increase the output of the inflator 40 in order to rupture the burst line portion 31. Accordingly, this contributes also to a reduction in the manufacturing cost.

Note that even in the FS airbag 32 that has a single chamber and is not provided with the chamber 38 for rupturing, by increasing the initial-stage tank pressure of the inflator 40 and increasing the amount of gas that is supplied to the FS airbag 32 in the initial stage of activation of the inflator 40, the timing of rupturing the burst line portion 31 can be made to be earlier. However, in a structure in which the FS airbag device 10 and the NS airbag device 58 are installed in the seat back 14 as in the present embodiment, if the initial-stage tank pressure of the inflator 40 is increased, it is no longer possible to maintain the internal pressure of the FS airbag 32 up to the time of restraining the vehicle occupant by the FS airbag 32. This point is described by using FIG. 4A through FIG. 7B.

Figure 4B:
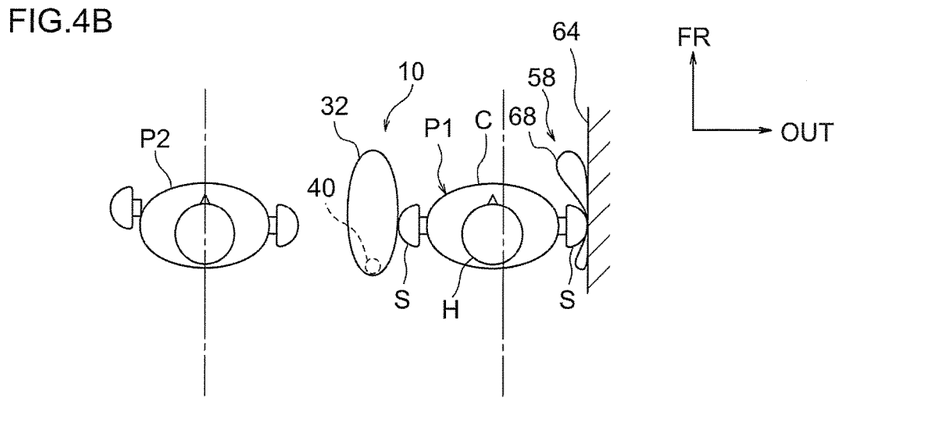
FIG. 4B is a plan view that corresponds to FIG. 4A and shows the situation after the point in time shown in FIG. 4A.
Figure 4C:
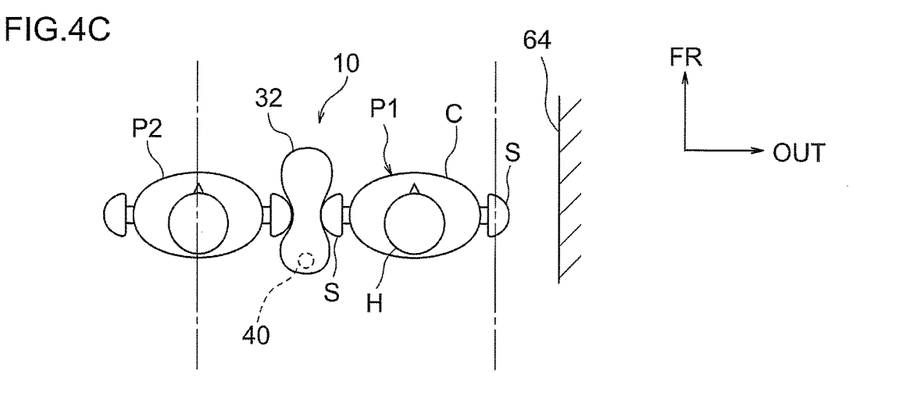
FIG. 4C is a plan view that corresponds to FIG. 4A and FIG. 4B and shows the situation after the point in time shown in FIG. 4B.

As shown in FIG. 4A, in the initial stage of a side collision, the vehicle occupant P1 at the collision side (the near side) is restrained by the NS airbag 68. Thereafter, as shown in FIG. 4B, the vehicle occupant P1 is displaced by the impact of the side collision toward the side opposite the collision (i.e., toward the far side), and contacts the FS airbag 32. Then, when the vehicle occupant P1 is displaced further toward the side opposite the collision, as shown in FIG. 4C, the FS air bag 32 is nipped between a vehicle occupant P2 at the far side and the vehicle occupant P1, and the vehicle occupants P1, P2 are restrained by the FS airbag 32.

Figure 6:
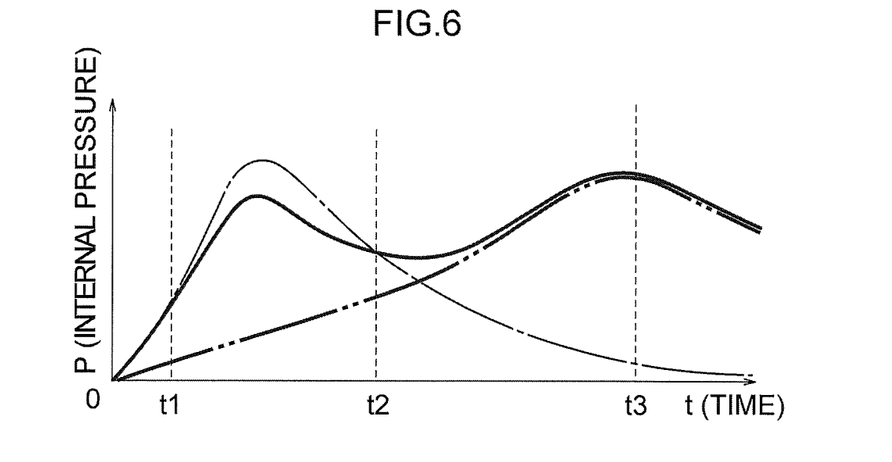
FIG. 6 is a graph showing the relationship between internal pressures of the far side airbag and a near side airbag, and times from activation of the respective inflators.
Figure 7A:
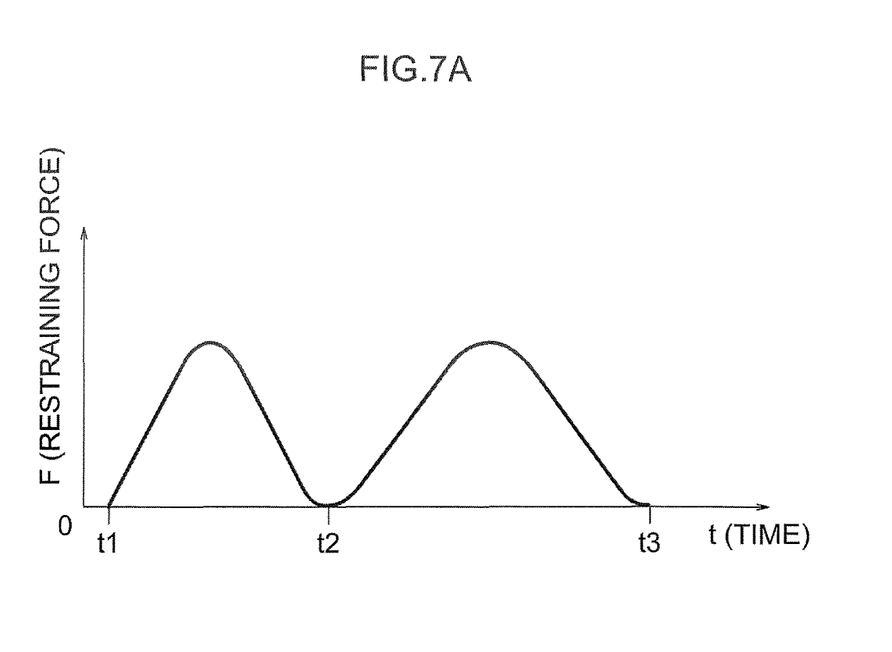
FIG. 7A is a graph showing the relationship between time from the occurrence of a side collision, and restraining force that a vehicle occupant at the near side receives from the near side airbag and the far side airbag.
Figure 7B:
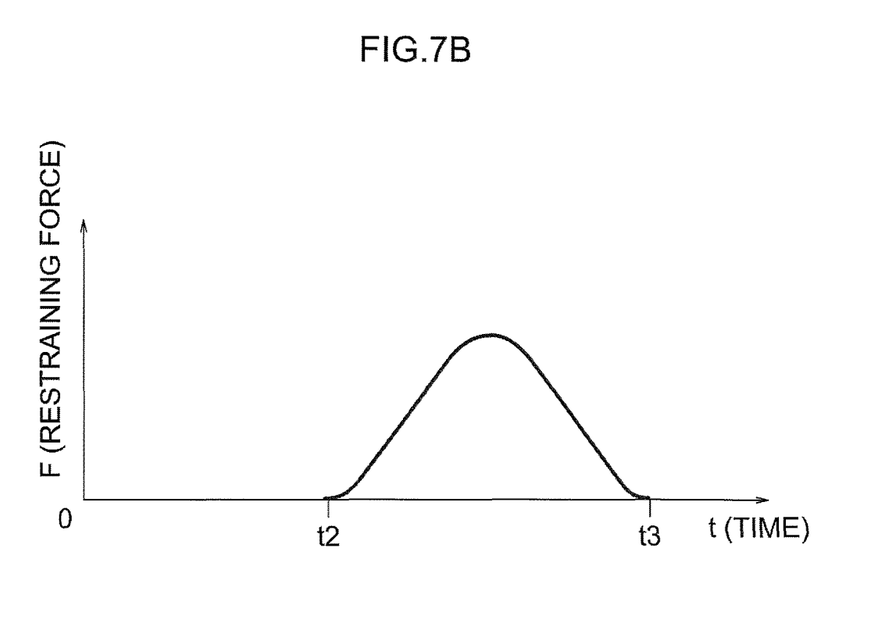
FIG. 7B is a graph showing the relationship between time from the occurrence of a side collision, and restraining force that a vehicle occupant at the far side receives from the far side airbag.

Namely, as shown in FIG. 7A, in the section from point in time t1 to point in time t2 in FIG. 7A, the vehicle occupant P1 at the near side receives restraining force from the NS airbag 68, and, in the section from point in time t2 to point in time t3 of FIG. 7A, the vehicle occupant P1 at the near side receives restraining force from the FS airbag 32. On the other hand, as shown in FIG. 7B, in the section from point in time t2 to point in time t3 of FIG. 7B, the vehicle occupant P2 at the far side receives restraining force from the FS airbag 32. Note that t1, t2 and t3 in FIG. 5 through FIG. 7B indicate the same points in time, respectively.

Figure 5:
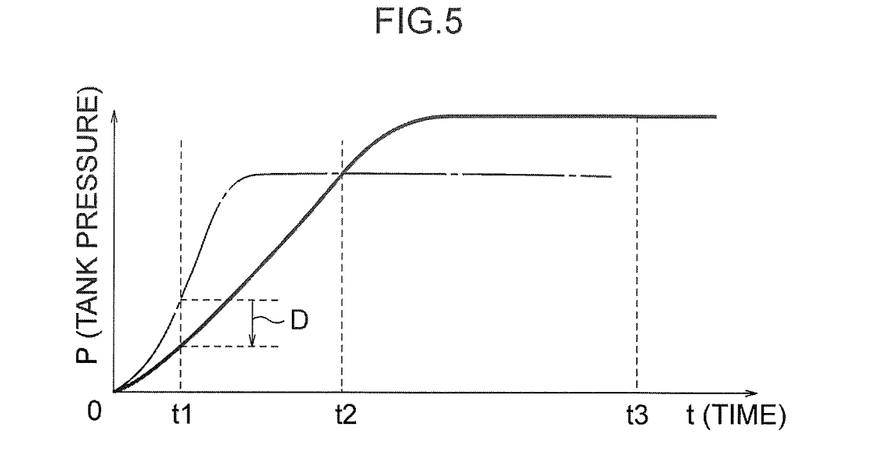
FIG. 5 is a graph showing the relationship between tank internal pressures at respective inflators at a far side and a near side, and times from activation.

In this way, because the timing at which the FS airbag 32 restrains the vehicle occupants P1, P2 is after the NS airbag 68 completes restraining of the vehicle occupant P1, the internal pressure of the FS airbag 32 must be maintained longer than the NS airbag 68. Therefore, as shown in FIG. 5, the tank pressure of the inflator 40 of the FS airbag device 10 (refer to the solid line in FIG. 5) is set such that the rise immediately after activation is gradual, so that the tank pressure of the inflator 40 is maintained longer than the tank pressure of the inflator 60 of the NS airbag device 58 (refer to the one-dot chain line in FIG. 5). As a result, when the burst line portion 31 is to be ruptured (point in time t1 in FIG. 5), the tank pressure of the inflator 40 rises only to a value that is lower than the tank pressure of the inflator 60 (refer to arrow D in FIG. 5). Thus, there is the possibility that the burst line portion 31 will not rupture at the appropriate timing, and the FS airbag 32 will burst within the central-side side portion 14A (so-called in-seat bursting). In order to prevent this, the FS airbag 32 must be expanded and deployed from the central-side side portion 14A within the same time as the NS airbag 68 (around 5 msec) from the activating of the inflators 40, 60.

With regard to this point, in the present embodiment, as shown in FIG. 6, in the initial stage of activation of the inflators 40, 60, the internal pressure of the chamber 38 for rupturing (refer to the solid line of FIG. 6) rises suddenly in the same way as the internal pressure of the NS airbag 68 (refer to the one-dot chain line of FIG. 6). Due thereto, the FS airbag 32 causes the burst line portion 31 to rupture at a similar time as the NS airbag 68 causes the burst line portion of the outer-side side portion 14B to rupture. As a result, in-seat bursting such as described above can be prevented, and the FS airbag 32 can be expanded and deployed stably. Further, as shown in FIG. 6, the internal pressure of the main chamber 36 (refer to the two-dot chain line in FIG. 6) continues to rise gradually until point in time t3 in FIG. 6, and therefore, the internal pressure of the FS airbag 32 can be maintained during the time (see FIG. 7) in which the FS airbag 32 restrains the vehicle occupants P1, P2.

Note that, in the above-described first embodiment, there is a structure in which, at the chamber 38 for rupturing, in the expanded and deployed state, the front portion side from the upper end portion 38U to the lower end portion 38L protrudes further toward the vehicle front side than the burst line portion 31. However, the technique of the present disclosure is not limited to this. Namely, it suffices for at least the lower end side region of the chamber 38 for rupturing in the expanded and deployed state to protrude further toward the vehicle front side than the burst line portion 31.

The aforementioned "at least the lower end side region of the chamber 38 for rupturing" is, for example, in a case in which the FS airbag 32 can restrain the region from the head portion H to the abdominal portion B of the vehicle occupant P, the region, that is positioned at a similar height as the abdominal portion B, at the chamber 38 for rupturing that is in the expanded and deployed state. Further, the aforementioned "lower side region" is, for example, in a case in which the FS airbag 32 can restrain the region from the head portion H to the chest portion C of the vehicle occupant P, the region, that is positioned at a similar height as the chest portion C, at the chamber 38 for rupturing that is in the expanded and deployed state. This point is the same as well for the other embodiments of the technique of the present disclosure that are described hereinafter. Note that, in the following embodiments, structures and operation that are basically similar to those of the above-described first embodiment are denoted by the same reference numerals as in the above-described first embodiment, and description thereof is omitted.

<Second Embodiment>

Figure 8:
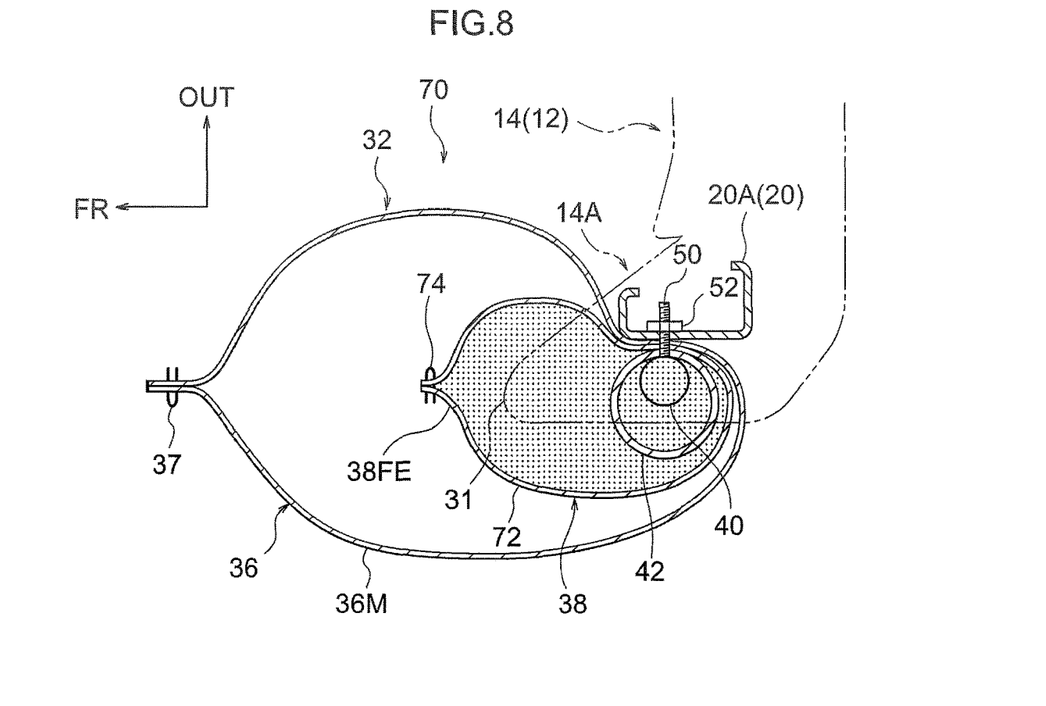
FIG. 8 is a cross-sectional view that corresponds to FIG. 2 and that shows an expanded and deployed state of a far side airbag in a far side airbag device for a vehicle relating to a second embodiment of the technique of the present disclosure.

The expanded and deployed state of the FS airbag 32 in a far side airbag device 70 for a vehicle relating to a second embodiment of the technique of the present disclosure, is shown in FIG. 8 in a cross-sectional view corresponding to FIG. 2. In this embodiment, instead of the sewn partitioning portion 34 relating to the above-described first embodiment, there is an inner bag 72 that serves as an example of the partitioning portion. This inner bag 72 is formed in the shape of an elongated bag due to a base cloth that is similar to the base cloth of the FS airbag 32 being folded in two and the outer peripheral edge portion being sewn at a sewn portion 74, and is provided at the rear portion side and the lower portion side of the FS airbag 32 interior. The FS airbag 32 is partitioned into the main chamber 36 and the chamber 38 for rupturing by this inner bag 72.

The inflator 40 and the diffuser 42 are housed in the chamber 38 for rupturing, and the stud bolts 50 of the inflator 40 are passed-through the base cloth of the inner bag 72. The inner bag 72, the diffuser 42 and the FS airbag 32 are fastened and fixed to the side frame 20A by this inflator 40. Further, the aforementioned sewn portion 74 is partially omitted at the upper end side and the lower end side of the inner bag 72. Further, the upper side communication port 46 and the lower side communication port 48 (not shown in FIG. 8) are formed at the places where the sewn portion 74 is partially omitted in this way. Structures other than those described above are similar to the above-described first embodiment.

In this embodiment as well, the chamber 38 for rupturing that houses the inflator 40 expands and deploys at an earlier stage and a higher pressure than the main chamber 36, and at least the lower end side region of the chamber 38 for rupturing protrudes further toward the vehicle front side than the burst line portion 31 (see FIG. 8). Due thereto, the burst line portion 31 can be ruptured at an appropriate timing, and thus, operation and effects that are similar to those of the above-described first embodiment can be obtained. Moreover, due to the sewn portion 35 being omitted from the FS airbag 32, the expanded thickness in the vehicle transverse direction of the FS airbag 32 is greater than in the above-described first embodiment, and therefore, the impact absorption stroke of the FS airbag 32 can be enlarged.

<Third Embodiment>

Figure 9:
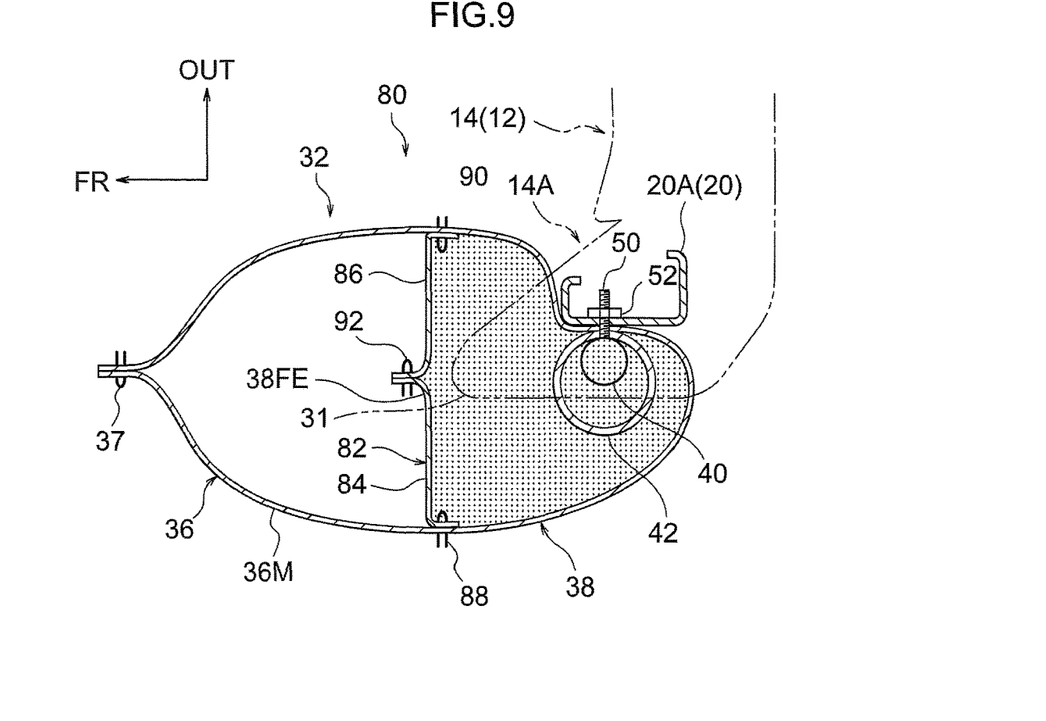
FIG. 9 is a cross-sectional view that corresponds to FIG. 2 and that shows an expanded and deployed state of a far side airbag in a far side airbag device for a vehicle relating to a third embodiment of the technique of the present disclosure.

The expanded and deployed state of the FS airbag 32 in a far side airbag device 80 for a vehicle relating to a third embodiment of the technique of the present disclosure, is shown in FIG. 9 in a cross-sectional view corresponding to FIG. 2. In this embodiment, instead of the sewn partitioning portion 34 relating to the above-described first embodiment, there is a tether 82 that serves as an example of the partitioning portion. This tether 82 is structured by two base cloths 84, 86 that are formed by cutting-out a cloth material, that is similar to the base cloth of the FS airbag 32, in substantially elongated strip shapes. The tether 82 is installed at a position similar to that of the sewn partitioning portion 34 relating to the above-described first embodiment.

The long side edge portion at one side of the one base cloth 84 is sewn to one side portion of the base cloth of the FS airbag 32 at a sewn portion 88. The long side edge portion of one side of the other base cloth 86 is sewn to the other side portion of the base cloth of the FS airbag 32 at a sewn portion 90. The other long side edge portions of the base cloths 84, 86 are sewn together at a sewn portion 92. The FS airbag 32 is partitioned into the main chamber 36 and the chamber 38 for rupturing by this tether 82. Communication ports (unillustrated openings) are formed respectively in the base cloths 84, 86 at the upper end side and the lower end side of the tether 82, and the main chamber 36 and the chamber 38 for rupturing communicate with one another via these communication ports. Structures other than those described above are similar to the above-described first embodiment.

In this embodiment as well, the chamber 38 for rupturing that houses the inflator 40 expands and deploys at an earlier stage and a higher pressure than the main chamber 36, and at least the lower end side region of the chamber 38 for rupturing protrudes further toward the vehicle front side than the burst line portion 31 (see FIG. 9). Due thereto, the burst line portion 31 can be ruptured at an appropriate timing, and thus, operation and effects that are similar to those of the above-described first embodiment can be obtained. Further, in this embodiment as well, due to the sewn portion 35 being omitted, the expanded thickness in the vehicle transverse direction of the FS airbag 32 is greater than in the above-described first embodiment, and therefore, the impact absorption stroke of the FS airbag 32 can be enlarged.

The technique of the present disclosure has been described above by illustrating several embodiments, but the technique of the present disclosure can be implemented by being changed in various ways within a scope that does not depart from the gist thereof. Further, the scope of the right of the technique of the present disclosure is, of course, not limited to the above-described respective embodiments.

What is claimed is:

1. A far side airbag device for a vehicle, comprising:
   an inflator that is disposed within a side support portion at a vehicle transverse direction central side of a seat back;
   an airbag that is stored within the side support portion, that receives a supply of gas from the inflator, that expands and deploys while rupturing a planned rupture portion that is installed at the side support portion and is formed by sewing together a plurality of seat skins, and that is adapted to protect a region at least from a head portion to a chest portion of a vehicle occupant; and
   a partitioning portion that partitions the airbag into a main chamber and a chamber for rupturing that is provided at a rear side and a lower side of the main chamber and that houses the inflator, at least a lower end side region of the chamber for rupturing, in an expanded and deployed state, protruding further toward a vehicle front side than the planned rupture portion, with communication ports, that communicate the respective chambers with one another, being formed at an upper end side and a lower end side of the partitioning portion,
   wherein a depression of a seat cushion is disposed within a width of the airbag in the vehicle transverse direction, and the planned rupture portion is offset toward a vehicle inner side, with respect to a location of the depression of the seat cushion, in the vehicle transverse direction.

2. The far side airbag device for a vehicle of claim 1, wherein a front portion side, from an upper end portion to a lower end portion of the chamber for rupturing, in the expanded and deployed state, protrudes further toward the vehicle front side than the planned rupture portion.

3. The far side airbag device for a vehicle of claim 2, wherein the chamber for rupturing is formed such that, in the expanded and deployed state, a front edge portion runs along the planned rupture portion.

4. The far side airbag device for a vehicle of claim 1, wherein the partitioning portion is structured by a sewn partitioning portion that includes a sewn portion at which the airbag is sewn.

5. The far side airbag device for a vehicle of claim 1, wherein the partitioning portion is structured by an inner bag that is provided within the airbag.

6. The far side airbag device for a vehicle of claim 1, wherein the partitioning portion is structured by a tether that is sewn to the airbag.

7. The far side airbag device for a vehicle of claim 1, wherein an opening surface area of the communication port formed at the lower end side of the partitioning portion is set to be larger than an opening surface area of the communication port formed at the upper end side of the partitioning portion.

8. The far side airbag device for a vehicle of claim 1, wherein the chamber for rupturing expands and deploys at an earlier stage and at a higher pressure than the main chamber when the inflator operates, and a low end side of the planned rupture portion is ruptured by a lower end portion of the chamber for rupturing, in an expanded and deployed state.

9. The far side airbag device for a vehicle of claim 1, wherein the partitioning portion in side view is formed with a lower end portion and a vertical direction intermediate portion that extend in a rectilinear form, and with an upper end portion that is convex toward the upper end side and that curves toward the rear side.

10. The far side airbag device for a vehicle of claim 1, wherein the planned rupture portion is separate from a location of the depression of the seat cushion.

* * * * *